(12) United States Patent
Ketsuka et al.

(10) Patent No.: US 10,630,856 B2
(45) Date of Patent: Apr. 21, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventors: Masakazu Ketsuka, Kanagawa (JP); Kohei Kaibara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/820,458

(22) Filed: Nov. 22, 2017

(65) Prior Publication Data

US 2018/0278782 A1    Sep. 27, 2018

(30) Foreign Application Priority Data

Mar. 23, 2017    (JP) .................................. 2017-057377

(51) Int. Cl.
G06F 15/00    (2006.01)
H04N 1/00    (2006.01)

(52) U.S. Cl.
CPC ....... H04N 1/00923 (2013.01); H04N 1/0097 (2013.01); H04N 1/00474 (2013.01); H04N 1/00477 (2013.01); H04N 1/00954 (2013.01); H04N 2201/0094 (2013.01)

(58) Field of Classification Search
CPC ........... H04N 1/00923; H04N 1/00474; H04N 1/00477; H04N 1/00954; H04N 1/0097

USPC ........................................................ 358/1.13
See application file for complete search history.

(56) References Cited

U.S. PATENT DOCUMENTS 5,852,501 A * 12/1998 Maehara ............ H04N 1/00702
                                                358/505
2008/0304660 A1* 12/2008 Sawayanagi .......... G06F 21/629
                                                380/44

FOREIGN PATENT DOCUMENTS

| JP | H0563904 | 3/1993 |
|---|---|---|
| JP | H05127450 | 5/1993 |
| JP | H09307732 | 11/1997 |

* cited by examiner

Primary Examiner — Mark R Milia
(74) Attorney, Agent, or Firm — JCIPRNET

(57) ABSTRACT

There is provided an information processing apparatus including: an execution unit that executes a first process or a second process with respect to a processing target in a case where an execution instruction is given to any one of the first process and the second process specified by a setting item and a preparatory action with respect to the processing target; a memory that stores the preparatory action in association with the setting item; and an execution controller that deems that the execution instruction is given in a case where the preparatory action stored in the memory is given, and controls the execution unit such that the first process or the second process specified by the preparatory action and the setting item stored in the memory in association with the preparatory action is executed with respect to the processing target.

12 Claims, 8 Drawing Sheets

FIG. 2

| JOB ID | JOB NAME | OPERATOR ID | SETTING ITEM | PREPARATORY ACTION |
|---|---|---|---|---|
| S001 | COPY | COMMON TO ALL OPERATORS | A B C ... | DISPOSITION OF DOCUMENT |
| S002 | COPY | U0123 | D E F ... | AUTHENTICATION AND DISPOSITION OF DOCUMENT |
| S003 | SCAN ELECTRONIC MAIL | COMMON TO ALL OPERATORS | G H I ... | SCREEN DISPLAY |
| S004 | PRINT | U0456 | J K L ... | AUTHENTICATION |
| ... | ... | ... | ... | ... |

| PROCESS | SETTING ITEM | EXAMPLE OF SETTING VALUE |
|---|---|---|
| COPY | COLOR MODE<br>SINGLE-SIDED/DOUBLE-SIDED<br>PAPER SIZE<br>MAGNIFICATION<br>N-UP<br>NUMBER OF COPIES | MONOCHROME<br>SINGLE-SIDED<br>A4<br>SAME SIZE<br>2 in 1<br>2 |
| SCAN ELECTRONIC MAIL | COLOR MODE<br>TRANSMISSION DESTINATION<br>SUBJECT<br>FILE NAME<br>RESOLUTION<br>EXTENSION | COLOR<br>abc@e.f<br>hoge<br>hoge.xdw<br>200ddi<br>xdw |
| FACSIMILE TRANSMISSION | TRANSMISSION DESTINATION<br>SUBJECT | 03-6908-xxxx<br>△△SPECIFICATION DRAFT |
| PRINT | COLOR MODE<br>SINGLE-SIDED/DOUBLE-SIDED<br>PAPER SIZE<br>N-UP | MONOCHROME<br>DOUBLE-SIDED<br>B5<br>1 in 1 |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-057377 filed Mar. 23, 2017.

BACKGROUND

Technical Field

The present invention relates to an information processing apparatus and a non-transitory computer readable medium storing a program.

SUMMARY

According to an aspect of the invention, there is provided an information processing apparatus including: an execution unit that, in a case where an execution instruction is given to any one of a first process and a second process, in which a setting item and a preparatory action are specified for a processing target, executes the first process or the second process with respect to the processing target; a memory that stores the preparatory action in association with the setting item; and an execution controller that, in a case where the preparatory action stored in the memory is given, deems that the execution instruction is given, and controls the execution unit such that the first process or the second process, in which the preparatory action and the setting item stored in the memory in association with the preparatory action are specified, is executed with respect to the processing target.

BRIEF DESCRIPTION OF THE DRAWINGS

Exemplary embodiment(s) of the present invention will be described in detail based on the following figures, wherein:

FIG. 2 is a diagram illustrating an example of a deemed instruction process table;

FIG. 3 is a diagram illustrating an example of setting values with respect to a setting item for each job type;

DETAILED DESCRIPTION

Figure 1:
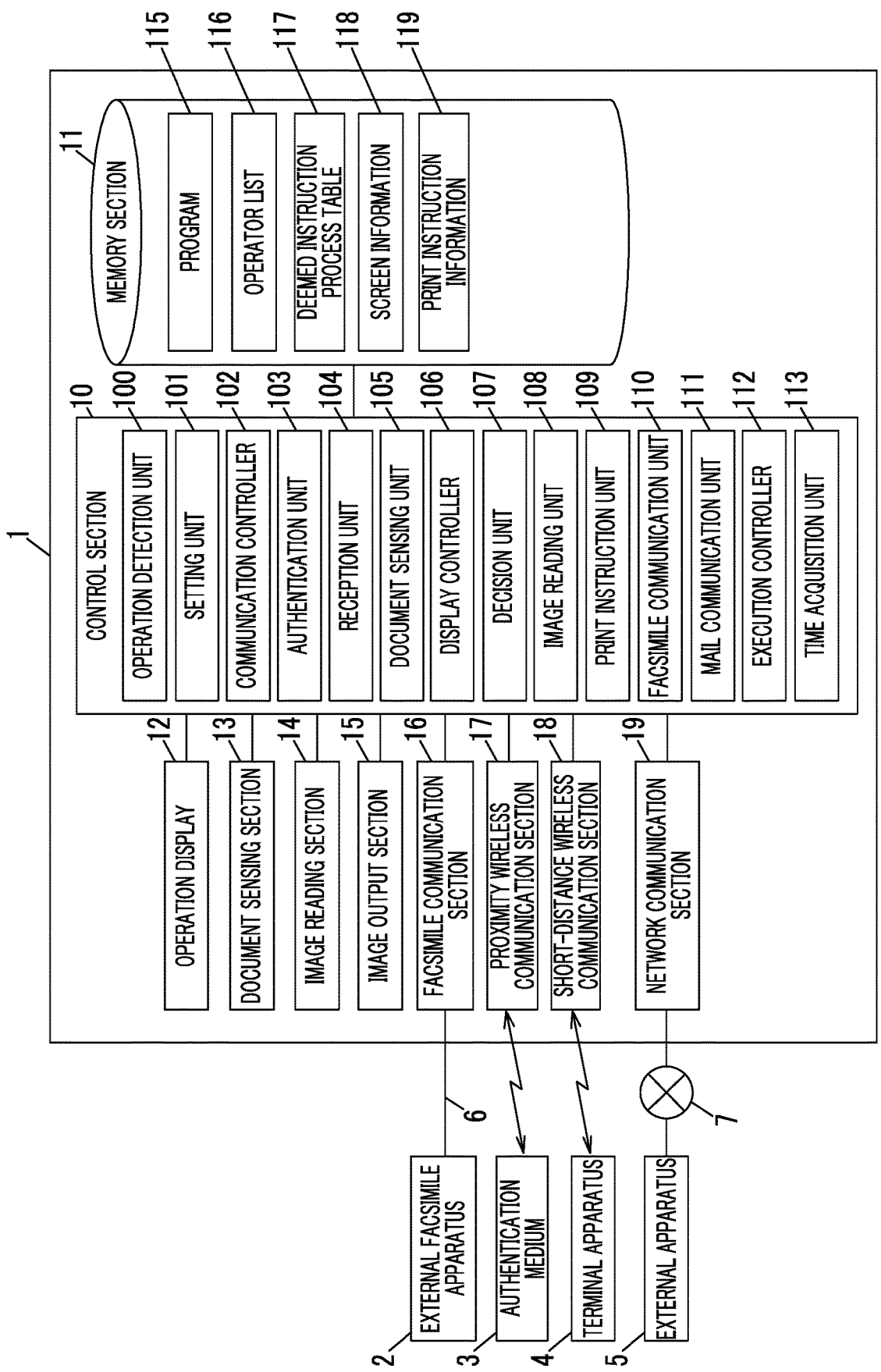
FIG. 1 is a block diagram illustrating an example of a control system of an image forming apparatus according to a first exemplary embodiment of the present invention.

Hereinafter, an embodiment of the invention will be described with reference to the accompanying drawings. Meanwhile, the same reference numerals are attached to components which have substantially the same function in the drawings, and description thereof will not be repeated. Hereinafter, although an image forming apparatus will be described as an example of an information processing apparatus, the information processing apparatus is not limited to the image forming apparatus.

Overview of Exemplary Embodiment

An image forming apparatus according to an exemplary embodiment includes: an execution unit that, in a case where an execution instruction is given to any one of a first process and a second process, in which a setting item and a preparatory action are specified for a processing target, executes the first process or the second process with respect to the processing target; a memory that stores the preparatory action in association with the setting item; and an execution controller that, in a case where the preparatory action stored in the memory is given, deems that the execution instruction is given, and controls the execution unit such that the first process or the second process, in which the preparatory action and the setting item stored in the memory in association with the preparatory action are specified, is executed with respect to the processing target.

The processing target indicates a target aimed by the first process and the second process. For example, the processing target includes a document to be copied, a document to be scanned, print data to be printed, and the like.

The first process and the second process includes a job, such as copying, scanning, printing, facsimile, electronic mail, or the like. The job indicates process instruction information used to instruct a process with respect to the processing target. In addition, the first process and the second process include electronic mail transmission performed by attaching data acquired by scanning (hereinafter, referred to as "scan electronic mail"), and transmission (hereinafter, referred to as "multi-sending") in which the facsimile transmission and the electronic mail transmission are simultaneously performed.

The "setting item" includes various set items which are necessary to execute the above-described jobs. The setting item is determined for each job. Specifically, the setting item includes various parameters relevant to the each job.

The "preparatory action" refers to various actions which are prepared by an operator and are necessary to execute the above-described job. The preparatory action is determined for each job. Specifically, the preparatory action includes, for example, start of each application which executes the above-described job, authentication of the operator, disposition (copying, facsimile communication, and the like) of the document on a document stand, and the like. Meanwhile, the start of the application includes, for example, display of a specific screen of the application.

The execution instruction refers to an instruction to start executing the above-described job, which is performed with respect to the image forming apparatus based on the operation of the operator. The execution instruction includes, for example, press of a start button included in the image forming apparatus, transmission of a job, such as a print job, to the image forming apparatus, an instruction using a sound of a predetermined message indicative of a start, and the like. Meanwhile, there is a case where the execution instruction is included in the preparatory action.

"Deemed that execution instruction is given" indicates that, even though a job execution instruction based on the operation of the above-described operator is not provided, the image forming apparatus starts to execute the above-described job similar to a case where the execution instruction is received. Hereinafter, "deemed that execution instruction is given" is also referred to as "deemed instruction process" as distinguished from a case of starting a job by receiving the execution instruction.

First Exemplary Embodiment

FIG. 1 is a block diagram illustrating an example of a control system of an image forming apparatus according to a first exemplary embodiment of the present invention.

The image forming apparatus 1 is a multi-function machine which has plural functions, for example, a scanning function, a printing function, a copying function, a facsimile transmission/reception function, an electronic mail transmission/reception function, and the like. Meanwhile, the image forming apparatus 1 may have any one of the above-described functions, and is not limited to the multi-function machine.

The image forming apparatus 1 includes a control section 10 that controls respective sections of the image forming apparatus 1, a memory section 11 that stores various data, an operation display 12 that inputs and displays information, a document sensing section 13 that senses a fact that the document is disposed on the document stand, which is not illustrated in the drawing, or a fact that paper is fed, an image reading section 14 that reads a document image from the document disposed on the document stand, an image output section 15 that prints an image, a facsimile communication section 16 that performs facsimile transmission/reception with respect to the external facsimile apparatus 2 through a public line network 6, a proximity wireless communication section 17 that performs proximity wireless communication with the contactless authentication medium 3, a short-distance wireless communication section 18 that communicates with the terminal apparatus 4, and a network communication section 19 that communicates with the external apparatus 5 through a network 7. The memory section 11 is an example of the memory. Meanwhile, the external facsimile apparatus 2, the terminal apparatus 4, and the external apparatus 5 may be a single device which is acquired by integrating the external facsimile apparatus 2, the terminal apparatus 4, and the external apparatus 5.

The control section 10 is composed of a Central Processing Unit (CPU), an interface, and the like. The CPU operates according to a program 115 stored in the memory section 11, and functions as an operation detection unit 100, a setting unit 101, a communication controller 102, an authentication unit 103, a reception unit 104, a document sensing unit 105, a display controller 106, a decision unit 107, an image reading unit 108, a print instruction unit 109, a facsimile communication unit 110, a mail communication unit 111, an execution controller 112, a time acquisition unit 113, and the like. The print instruction unit 109, the image reading unit 108, the facsimile communication unit 110, and the mail communication unit 111 are examples of the execution unit. Each of the units 100 to 113 will be described in detail later.

The memory section 11 is composed of a Read Only Memory (ROM), a Random Access Memory (RAM), a hard disk, and the like, and stores the program 115, an operator list 116, a deemed instruction process table 117, a screen information 118, a print instruction information 119, and the like.

The operation display 12 is, for example, a touch panel display, and has a configuration in which a touch panel is disposed in front of a display, such as a liquid crystal display, in a polymerization manner.

It is possible to use a light-transmissive light emitting and receiving unit using light reception elements disposed to correspond to light emitting elements or a reflective light emitting and receiving unit using the light emitting elements and the light reception elements, which are disposed in the same directions, as the document sensing section 13. The document sensing section 13 senses a document disposed on the document stand using the light-transmissive light emitting and receiving unit or the reflective light emitting and receiving unit, or a document fed to the document stand by an automatic paper feeding device.

The image reading section 14 reads the document image from the document, includes the automatic paper feeding device provided on the document stand and a scanner, and optically reads the document image from the document disposed on the document stand or the document fed by the automatic paper feeding device.

The image output section 15 prints a color image or a monochrome image using, for example, electro-photographic method, an ink jet method.

The facsimile communication section 16 modulates and demodulates data according to a facsimile protocol such as G3 or G4, and performs facsimile communication through telephone lines.

The proximity wireless communication section 17 performs the proximity wireless communication (for example, NFC) in which a communicable distance from the authentication medium 3 is, for example, approximately 10 cm or shorter. The authentication medium 3 is, for example, a contactless IC card determined in an NFC forum.

The short-distance wireless communication section 18 transmits and receives a signal to and from the terminal apparatus 4 using Wi-Fi (registered trade mark), BlueTooth (registered trade mark), and the like. It is possible to use, for example, a personal computer, a tablet-type terminal, a multi-function mobile phone (smart phone), or the like as the terminal apparatus 4.

The network communication section 19 transmits and receives a signal to and from the external apparatus 5 through the network 7. The external apparatus 5 includes, for example, a personal computer, a server device, and the like. In the exemplary embodiment, the external apparatus 5 is described as the server device. The network 7 is, for example, a Local Area Network (LAN), the Internet, the Intranet, or the like, and may be wired or wireless.

Configuration of Deemed Instruction Process Table

FIG. 2 is a diagram illustrating an example of the deemed instruction process table 117. In the deemed instruction process table 117, a deemed instruction process, an ID of an operator who sets the deemed instruction process, a setting item of the deemed instruction process, and a preparatory action are registered in association with each other.

The deemed instruction process table 117 is provided with a "job ID" field, a "job name" field, an "operator ID" field, a "setting item" field, and a "preparatory action" field. In the "job ID" field, an ID which identifies the deemed instruction process is registered. In the "job name" field, a name of the job, which is a target of the deemed instruction process, is registered. In the "operator ID" field, an ID which identifies the operator is registered. In a case where an individual operator is targeted, an ID of the individual operator, such as "U0123", is registered. In a case where the operator is not discriminated, for example, "common to all users" is registered.

In the "setting item" field, a detailed setting item is registered for each job type. FIG. 3 is a diagram illustrating an example of a setting value with respect to the setting item for each job type. In an "example of setting value" field of FIG. 3, a detailed example of the setting item is illustrated. As illustrated in FIG. 3, the setting item of copying includes, for example, parameters, such as a color mode, single-sided/double-sided, a paper size (printing paper size), a magnification, N-up, and the number of copies. The setting item of the scan electronic mail includes, for example, parameters such as a color mode, a transmission destination, a subject, an attached file name, resolution, and extension. The setting item of the facsimile transmission includes, for example, parameters such as a transmission destination and a subject. The setting item of printing includes parameters such as a color mode, single-sided/double-sided, a paper size (a size of print paper), and N-up. The parameters are selected or input through an operation of the operator. Meanwhile, the examples illustrated in FIG. 3 are only examples, and the present invention is not limited thereto.

In the "preparatory action" field of FIG. 2, a preparatory action, which is a condition for starting execution of a job, is registered. The preparatory action is referred to as an alternative to a job execution instruction. The preparatory action is registered through the operation of the operator. Meanwhile, as illustrated in an example of "job ID" S003 of FIG. 2, plural preparatory actions may be registered with respect to one job.

The operation detection unit 100 detects various operations which are performed by the operator with respect to a screen displayed on the operation display 12, and notifies the display controller 106 and the setting unit 101 of a detection result. An operation detected by the operation detection unit 100 includes an operation of setting the deemed instruction process and an operation with respect to the screen displayed on the operation display 12.

The setting unit 101 sets the setting item and the preparatory action of a job, which is a target of the deemed instruction process, based on the operation performed by the operator and detected by the operation detection unit 100, and registers the set setting item and the preparatory action in the deemed instruction process table 117.

The communication controller 102 controls the proximity wireless communication section 17 such that the proximity wireless communication is performed. That is, in a case where a wireless signal is transmitted from the proximity wireless communication section 17 and connection of the proximity wireless communication is established, communication controller 102 receives individual identification information, such as an operator ID and an individual identification number, from the authentication medium 3 through the proximity wireless communication.

In a case where the communication controller 102 acquires the individual identification information, such as the operator ID, from the authentication medium 3, the authentication unit 103 performs an authentication process based on the acquired individual identification information. Specifically, the authentication unit 103 determines whether or not the individual identification information is registered in the operator list 116 of the memory section 11, and notifies the decision unit 107 which will be described later in an authentication result.

In a case where the operator ID is directly input through the operation with respect to the operation display 12, there is a case where the authentication process is performed based on the operator ID which is directly input. In addition, the present invention is not limited to the authentication of the individual identification information, and, for example, a fact that the operator comes to the front of the image forming apparatus 1 may be authenticated using facial authentication or the like.

The reception unit 104 receives an operation of switching between availableness and unavailableness of control performed by the execution controller 112 which will be described later. Specifically, the reception unit 104 receives an operation of switching the control performed by the execution controller 112 from validity into invalidity (hereinafter, referred to as a "release operation") or an operation of switching the control from invalidity into validity (hereinafter, referred to as an "recovery operation") for each process through the operation of the operator with respect to the operation display 12.

The document sensing unit 105 senses a fact that a cover (not illustrated in the drawing) of the document stand is closed. In addition, the document sensing unit 105 controls a light emitting part of the document sensing section 13 to perform irradiation of light, detects whether or not a document exists on the document stand based on a quantity of light which is received by a light reception part of the document sensing section 13, and notifies the decision unit 107 of a detection result.

The display controller 106 performs control such that various screens (for example, see FIGS. 4 to 7), which are stored in the memory section 11 as the screen information 118, are displayed on the operation display 12 based on the operation performed by the operator and detected by the operation detection unit 100. In addition, the display controller 106 detects a fact that a specific screen is displayed, and notifies the decision unit 107 of a display result. The specific screen refers to a screen which is set in the preparatory action and, for example, a screen which is displayed in a case where the application starts.

In addition, the display controller 106 performs control such that the reception unit 104 corresponding to a job, in which the control performed by the execution controller 112 is available, and the reception unit 104 corresponding to a job, in which the control performed by the execution controller 112 is unavailable, are separately displayed. Specifically, the display controller 106 performs control such that the reception unit 104 corresponding to the job, in which the control performed by the execution controller 112 is available, is highlighted. For example, a method for coloring the whole reception unit 104 in a color, a method for hashing the reception unit 104, or a method for expressing a frame of the reception unit 104 by a bold line may be used for highlighting.

In addition, in a case where the preparatory action is not performed by the operator, the display controller 106 performs control such that a message which guides the action is displayed. For example, in a case where "disposition of document" is registered as a preparatory action for copying, for example, control is performed such that a message "copying will be executed after the document is arranged" is displayed.

In addition, the display controller 106 performs control such that the reception unit 104 corresponding to the job, in which the control performed by the execution controller 112 is available, is displayed prior to the reception unit 104 corresponding to a job in which the control performed by the execution controller 112 is unavailable.

The decision unit 107 decides whether or not the deemed instruction process is set based on the operation of the operator. Specifically, decision unit 107 decides, based on the authentication result acquired by the authentication unit 103, a document detection result acquired by the document sensing unit 105, and a display result acquired by the display controller 106, whether or not a preparatory action corresponding to the results is registered in the deemed instruction process table 117 stored in the memory section 11.

In addition, the decision unit 107 determines, based on the authentication result acquired by the authentication unit 103, the document detection result acquired by the document sensing unit 105, and the display result acquired by the display controller 106, whether or not a condition (hereinafter, referred to as "job start condition") which is necessary for the job is satisfied. Decision of the job start condition may include a decision on whether or not the preparatory action in the job registered in the deemed instruction process table 117 is completed, a decision whether or not the setting item is set, and a decision whether or not another condition, which is a premise of the execution of the job, is satisfied. In addition, the decision unit 107 notifies the execution controller 112 of the decision result.

In addition, the decision unit 107 decides whether the control performed by the execution controller 112 for each job is available or unavailable. Specifically, the decision unit 107 decides whether or not the reception unit 104 receives the release operation with respect to a designated job.

The image reading unit 108 controls the image reading section 14 and reads the document disposed on the document stand or the fed document. In addition, the image reading unit 108 performs an image process, such as compression, extension, or synthesis of images which are read by the image reading section 14.

The print instruction unit 109 receives a print job, which instructs to print image data, from the terminal apparatus 4 or the external apparatus 5, and stores the print instruction information 119, such as print data (image data) and print condition included in the received print job, in the memory section 11. In addition, the print instruction unit 109 stores the image data read by the image reading section 14 as the print instruction information 119 in the memory section 11. The print instruction unit 109 executes the print job using the image output section 15 according to the print instruction information 119 stored in the memory section 11.

The facsimile communication unit 110 prepares a transmission sheet, in which names of a transmission source and a transmission destination, a facsimile number, a telephone number, text, and the like are written, attaches the image data to the transmission sheet, and performs facsimile transmission of the transmission sheet to the transmission destination using the facsimile communication section 16.

The mail communication unit 111 prepares the transmission sheet, in which names of a transmission source and a transmission destination, a mail address, text, and the like are written, attaches the image data to the transmission sheet, and performs electronic mail transmission/reception through the network communication section 19.

The execution controller 112 controls the image reading unit 108, the print instruction unit 109, the facsimile communication unit 110, and the mail communication unit 111 for a decision result acquired by the decision unit 107, and executes respective jobs thereof. In a case where the reception unit 104 receives the release operation for the designated job, control of the job designated by the execution controller 112 becomes unavailable. That is, a state in which the deemed instruction process does not function is made. In contrast, in a case where the reception unit 104 receives the recovery operation, control of the job designated by the execution controller 112 becomes available. That is, a state in which the deemed instruction process functions is made.

In addition, in a case where the preparatory action which is set in the deemed instruction process is common to two or more jobs, the execution controller 112 executes the jobs according to predetermined priorities based on the operation of the operator in a case where the preparatory action exists. In this case, the display controller 106 performs control such that the reception unit 104 is highlighted according to the priorities.

For example, in a case where copying and scanning are registered as the deemed instruction process and the preparatory actions thereof are both "authentication", the execution controller 112 executes a job, in which the predetermined priority is higher, between the copying and the scanning. In addition, in a case where both the copying and the scanning are available, the display controller 106 performs control such that the reception unit 104 corresponding to the job, in which the priority is higher, is highlighted.

The time acquisition unit 113 acquires current time and notifies the decision unit 107 of the current time.

Operation of First Exemplary Embodiment

Figure 4:
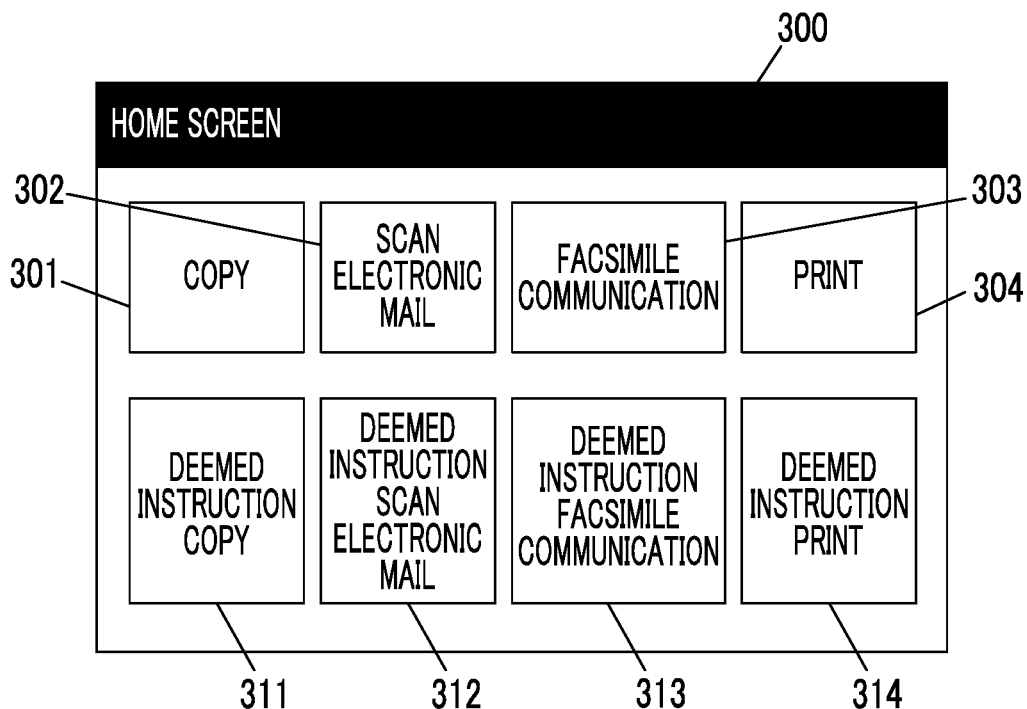
FIG. 4 is a diagram illustrating an example of a home screen.

Subsequently, an example of an operation of the image forming apparatus 1 will be described with reference to FIGS. 4 to 8. FIG. 4 is a diagram illustrating an example of a home screen. The display controller 106 displays a home screen 300 on the operation display 12 based on the operation performed by the operator and detected by the operation detection unit 100. FIG. 8 is a flowchart illustrating an example of the operation of the image forming apparatus according to the first exemplary embodiment of the present invention.

As illustrated in FIG. 4, it is assumed that the home screen 300 is displayed on the operation display 12. Buttons 301 to 304 and 311 to 314 corresponding to jobs, which are executed by the image forming apparatus 1, are displayed on the home screen 300. In a case where the operator operates any one of the buttons 301 to 304 and 311 to 314, the control performed by the execution controller 112 is switched from available to unavailable or from unavailable to available.

Meanwhile, in the exemplary embodiment, the buttons 301 to 304 corresponding to normal jobs are displayed at an upper part of the home screen 300. In addition, the buttons 311 to 314 corresponding to the deemed instruction process are displayed at a lower part of the home screen 300. The buttons 311 to 314 corresponding to the deemed instruction process are examples of the reception unit 104.

In a case where the operation detection unit 100 detects an operation of the button performed by the operator, the control, which is performed by the execution controller 112 on the job displayed on the button operated by the operator, becomes available. The display controller 106 performs control such that the button 311 corresponding to the job is highlighted using a predetermined method.

The operation detection unit 100, the authentication unit 103, the document sensing unit 105, and the like detect the preparatory action (S1). Subsequently, the decision unit 107 decides whether or not the deemed instruction process is set based on the operation of the operator (S2). In a case where the deemed instruction process is set (S2: Yes), the decision unit 107 decides whether the job start condition is satisfied (S3). In a case where the job start condition is satisfied (S3: Yes), the decision unit 107 decides whether or not the release operation is performed through the operation of the operator based on a fact whether or not the reception unit 104 receives the release operation. In a case where the release operation is not performed, that is, the control performed by the execution controller 112 on the job is available (S4: Yes), the job is executed by the print instruction unit 109, the image reading unit 108, the facsimile communication unit 110, and the mail communication unit 111 (S5). Hereinafter, an example of the preparatory action will be described in detail.

(1) Example in which Preparatory Action in Deemed Instruction Copy Includes "Disposition of Document"

In a case where the operation detection unit 100 detects the operation of the "deemed instruction copy" button 311 of the home screen 300, which is performed by the operator, the control performed by the execution controller 112 on the deemed instruction process relevant to copy (hereinafter, referred to as "deemed instruction copy") is available. That is, a state in which the deemed instruction copy functions is made. In a case where the deemed instruction copy is available, the display controller 106 performs control such that a deemed instruction copy button 311 is highlighted using a predetermined method.

In a case where a document is disposed on the document stand through the operation of the operator, the document sensing unit 105 detects the document using the document sensing section 13 (S1), and notifies the decision unit 107 of document detection. Subsequently, the decision unit 107 decides whether or not the deemed instruction process, in which the "disposition of document" is the preparatory action, is registered in the deemed instruction process table 117 of the memory section 11 (S2).

In a case where the deemed instruction process, in which the "disposition of document" is the preparatory action, is registered (S2: Yes), the decision unit 107 decides whether or not the job start condition is satisfied (S3). Specifically, decision unit 107 decides whether or not the setting item of the registered deemed instruction process is set, whether or not copying paper is replenished, and the like. In a case where the setting item of the deemed instruction process is set and the copying paper is replenished, the decision unit 107 decides that the job start condition is satisfied.

In a case where the job start condition is satisfied (S3: Yes), the decision unit 107 decides whether the control performed by the execution controller 112 on the deemed instruction process is available or unavailable (S4). That is, in a case where the release operation is not performed, the decision unit 107 decides whether or not the control performed by the execution controller 112 on the deemed instruction process is available.

In a case where the control performed on the deemed instruction process is available (S4: Yes), the print instruction unit 109 controls the image output section 15 and executes the print job (S5). As described above, in a case where the operator performs the "disposition of document", the image forming apparatus 1 is deemed that the execution instruction is given and copying is executed.

Figure 5:
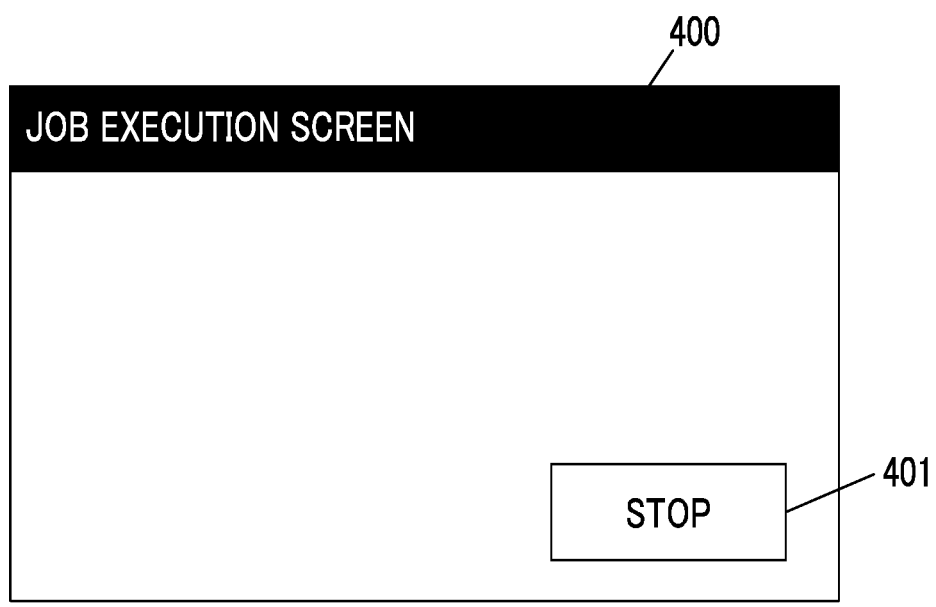
FIG. 5 is a diagram illustrating an example of a job execution screen.

FIG. 5 is a diagram illustrating an example of a job execution screen. The display controller 106 displays a job execution screen 400 while the job is being executed. As illustrated in FIG. 5, the job execution screen 400 includes a "stop" button 401. The reception unit 104 receives an operation of the "stop" button 401, which is performed by the operator. In this case, the execution controller 112 causes the control of the deemed instruction copy to be unavailable.

In a case where the operation detection unit 100 detects the operation of the deemed instruction copy button 311 highlighted through the operation of the operator, the control of the deemed instruction copy becomes unavailable. That in a case where the operator operates the highlighted deemed instruction copy button 311, a state in which the deemed instruction copy does not function is made.

As described above, in a case where the operator does not desire the deemed instruction copy, the deemed instruction copy does not function temporarily.

(2) Example in which Preparatory Action in Deemed Instruction Copy Includes "Authentication" and "Disposition of Document"

In a case where the authentication medium 3 is put on the proximity wireless communication section 17 through the operation of the operator and thus the document is disposed on the document stand, the communication controller 102 acquires individual identification information of the operator from the authentication medium 3, the authentication unit 103 performs the authentication process based on the acquired individual identification information, and the document sensing unit 105 detects the document using the document sensing section 13 (S1) and notifies the decision unit 107 of the document detection. Subsequently, the decision unit 107 decides whether or not the deemed instruction process, in which "authentication" and "disposition of document" are the preparatory actions, is registered in the deemed instruction process table 117 of the memory section 11 (S2).

Hereinafter, an operation is performed similar to the above-described steps S3 to S5. That is, in a case where the deemed instruction process, in which "authentication" and "disposition of document" are the preparatory actions, is registered in the deemed instruction process table 117 of the memory section 11 (S2: Yes), the decision unit 107 decides whether or not the job start condition is satisfied (S3) and decides whether the control of the deemed instruction process is available or unavailable (S4). In a case where the job start condition is satisfied (S3: Yes) and the control of the deemed instruction process is available (S4: Yes), the print instruction unit 109 controls the image output section 15 and executes the print job (S5).

Meanwhile, in step S3, the job start condition decision may include a decision whether or not the operator ID acquired by the communication controller 102 coincides with the operator ID (for example, "U0123") registered in the deemed instruction process table 117. In this manner, in a case where an operator who is not registered in the deemed instruction process table 117 performs the preparatory action, the deemed instruction process is prevented from being performed.

Figure 6:
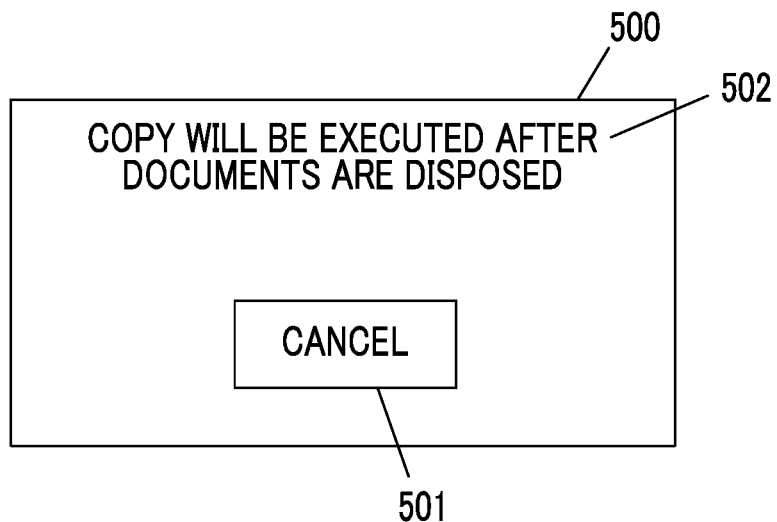
FIG. 6 is a diagram illustrating an example of a guide message screen.

FIG. 6 is a diagram illustrating an example of a guide message screen. In a case where the operator does not dispose the document on the document stand after authentication is performed by the authentication unit 103, the display controller 106 displays a guide message screen 500, which displays a guide message, on the operation display 12. As illustrated in FIG. 6, in the guide message screen 500, a guide message 502 which guides "disposition of document" registered as the preparatory action, that is, "copying will be executed after the document is disposed" is displayed.

In addition, in the guide message screen 500, a cancel button 501 is provided. Similar to the above-described stop button 401 (see FIG. 5), in a case where the reception unit 104 receives an operation of the cancel button 501, which is performed by the operator, the execution controller 112 causes the control of the deemed instruction process to be unavailable.

Even in a case where the operator temporarily forgets registered content of the preparatory action with respect to the deemed instruction copy, if the operator performs an operation according to content of the guide message 502, the deemed instruction copy is executed.

Meanwhile, the authentication performed by the authentication unit 103 is not limited to authentication using the authentication medium 3, and may be password authentication, facial authentication, and the like. In addition, in the above-described example, an example in which the deemed instruction copy is registered in the specific operator (ID "U0123", see FIG. 2) has been described. However, the present invention is not limited thereto and may be commonly registered in plural operators (for example, all operators who use the image forming apparatus 1). In this case, instead of the authentication performed by authentication unit 103, designated job may be executed using the fact that the operator comes in front of the image forming apparatus 1 as the preparatory action.

In addition, in the above description, a case where the document is installed after operator authentication is performed has been described. However, the present invention is not limited to the order, and the operator authentication may be performed after the document is first installed. In this case, execution of copy may start after the operator authentication is performed.

In addition, in a case where the preparatory action is set to "disposition of document in predetermined size" and a document in the predetermined size is installed, execution of copy may start.

(3) Example in which Preparatory Action in Deemed Instruction Scan Electronic Mail Includes "Screen Display"

In a case where the operation detection unit 100 detects an operation of a "deemed instruction scan electronic mail" button 312 of the home screen 300, which is performed by the operator, control of the deemed instruction process (hereinafter, referred to as "deemed instruction scan electronic mail") relevant to the scan electronic mail by the execution controller 112 becomes available. That is, a state in which the deemed instruction scan electronic mail functions is made. In a case where the deemed instruction scan electronic mail is available, the display controller 106 performs control such that the deemed instruction scan electronic mail button 312 is highlighted using a predetermined method.

In a case where the predetermined screen is displayed through the operation of the operator, the display controller 106 detects the fact that the specific screen is displayed (S1), and notifies the decision unit 107 of a display result. Hereinafter, an operation is performed similar to steps S2 to S5 in the above-described deemed instruction copy. That is, the decision unit 107 decides whether or not the deemed instruction process in which "screen display" is the preparatory action is registered in the deemed instruction process table 117 of the memory section 11 (S2). Subsequently, the decision unit 107 decides whether the job start condition is satisfied (S3) and, subsequently, decides whether the control of the deemed instruction process is available or unavailable (S4). In cases where the job start condition is satisfied (S3: Yes) and the control of the deemed instruction process is available (S4: Yes), the image reading unit 108 controls the image reading section 14 and executes reading of the document which is disposed on the document stand. Subsequently, the image reading unit 108 performs the image process, such as compression, extension, or synthesis of images which are read by the image reading section 14. The mail communication unit 111 attaches the image data, on which the image process is performed, to the transmission sheet and performs electronic mail transmission through the network communication section 19 (S5).

Meanwhile, in step S3, the job start condition decision may include a decision whether or not the document is disposed on the document stand. In this manner, transmission is prevented in a state in which a document to be scanned is not installed.

Figure 7:
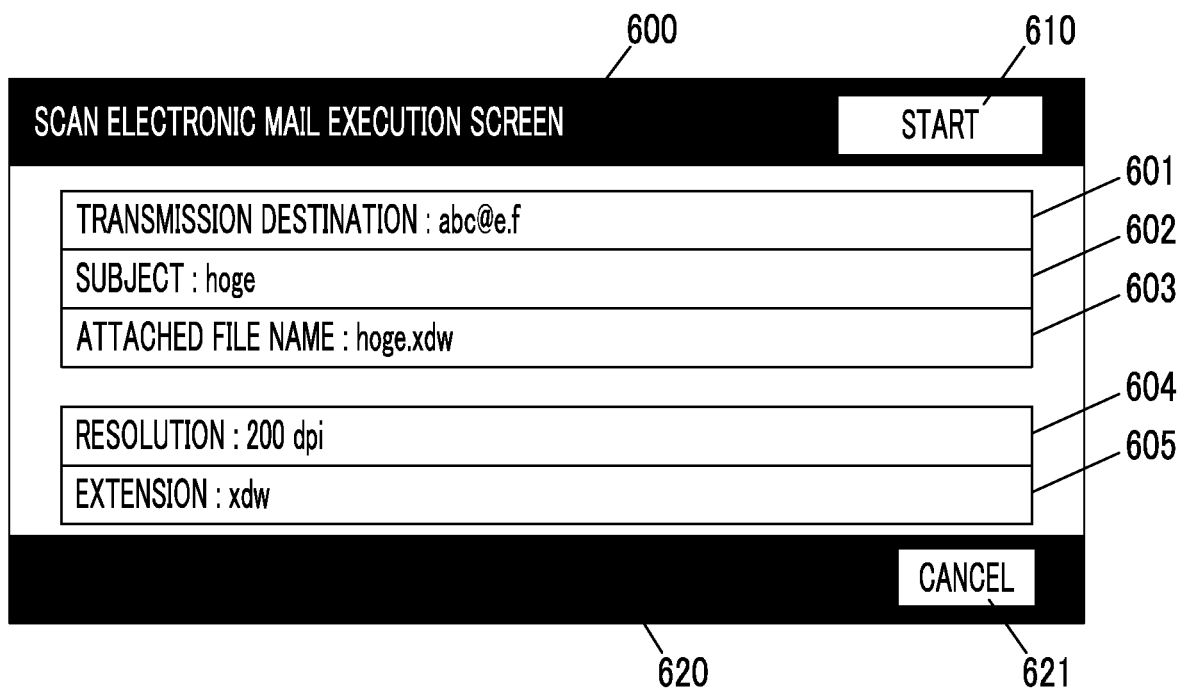
FIG. 7 is a diagram illustrating an example of a scan electronic mail screen.
Figure 8:
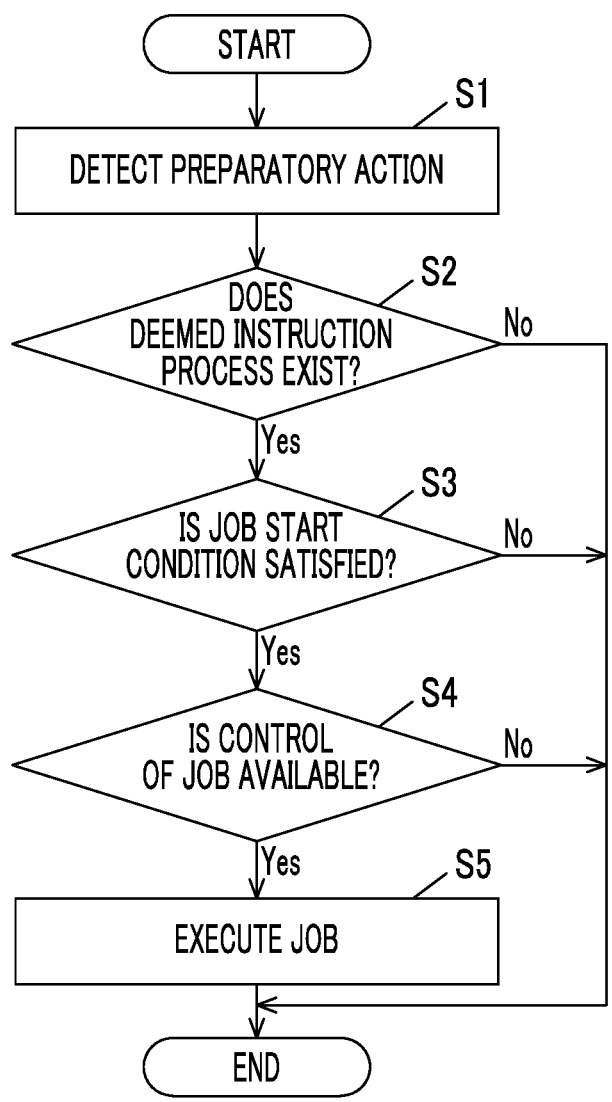
FIG. 8 is a flowchart illustrating an example of an operation of the image forming apparatus according to the first exemplary embodiment of the present invention.

FIG. 7 is a diagram illustrating an example of a scan electronic mail screen. While the job is being executed, the display controller 106 displays a scan electronic mail execution screen 600. As illustrated in FIG. 7, the scan electronic mail execution screen 600 includes a transmission destination field 601 indicative of the transmission destination which is registered as a setting item in advance, a subject field 602 indicative of a subject, an attached file name field 603 indicative of an attached file name, a resolution field 604 indicative of resolution of the attached file, and an extension field 605 indicative of extension of the attached file. The setting item corresponds to the setting item of the job ID "S003" illustrated in FIG. 2.

In addition, the scan electronic mail execution screen 600 includes a guide message 620 and a cancel button 621. Functions of the guide message 620 and the cancel button 621 are respectively similar to the guide message 502 and the cancel button 501 of the above-described deemed instruction copy.

In addition, the scan electronic mail execution screen 600 may include start button 610 that starts execution of the scan electronic mail through the operation of the operator. In this manner, in a case where final determination of the start of the scan electronic mail is entrusted to the operation of the operator, the operator recognizes the setting item of the scan electronic mail, and a case of erroneous registration and erroneous transmission by mistake of the operator are prevented.

(4) Example in which Preparatory Action in Deemed Instruction Print Includes "Authentication"

In a case where the operation detection unit 100 detects an operation of a "deemed instruction print" button 314 of the home screen 300, which is performed by the operator, control of a deemed instruction process (hereinafter, referred to as "deemed instruction print") relevant to print by the execution controller 112 becomes available. That is, a state in which the deemed instruction print functions is made. In a case where the deemed instruction print is available, the display controller 106 performs control such that the deemed instruction print button 314 is highlighted using a predetermined method.

In a case where the authentication is not performed in the print process in which the "authentication" is the preparatory action, the server device (external apparatus 5) receives the print job transmitted from the terminal apparatus 4 or the like and accumulates the print job in a memory unit in the server device (external apparatus 5). In a case where the authentication is performed, the print job accumulated in the server device (external apparatus 5) is transmitted to the image forming apparatus 1.

In a case where the authentication medium 3 is put on the proximity wireless communication section 17 through the operation of the operator, the communication controller 102 acquires individual identification information of the operator from the authentication medium 3, and the authentication unit 103 performs the authentication process based on the acquired individual identification information (S1) and notifies the decision unit 107 of the authentication result. In a case where the authentication is established, the print instruction unit 109 receives a print job which is transmitted from the server device (external apparatus 5). Meanwhile, in a case where the print job is transmitted to the server device (external apparatus 5) from the terminal apparatus 4 after the authentication is established, the print job may be directly transmitted to the image forming apparatus 1 without accumulating the print job in the memory unit of the server device (external apparatus 5).

Subsequently, the decision unit 107 decides whether or not the deemed instruction process, in which "authentication" is the preparatory action, is registered in the deemed instruction process table 117 of the memory section 11 (S2), decides whether or not the job start condition is satisfied (S3), and decides whether the control of the deemed instruction process is available or unavailable (S4). In cases where the job start condition is satisfied (S3: Yes) and the control of the deemed instruction process is available (S4: Yes), the print instruction unit 109 executes the print job using the image output section 15 (S5).

Meanwhile, in step S3, the job start condition decision may include a decision whether or not the operator ID acquired by the communication controller 102 coincides with the operator ID (for example, "U0456") registered in the deemed instruction process table 117. In this case, the print job is not executed with respect to an operator who has an ID which is different from the operator ID registered in the deemed instruction process table 117. In this manner, printing performed by an operator who is not registered in the deemed instruction process is prevented.

In addition, the job start condition decision may include a decision whether or not the print condition included in the print job coincides with a setting condition registered in the setting item. For example, in a case where the color mode is registered as "monochrome" and the print condition included in the print job is "color", the decision unit 107 decides that the job start condition is not satisfied. In this manner, printing is performed with setting item which is not registered in the deemed instruction process is prevented.

In addition, in a case where the operator ID acquired by the communication controller 102 is different from the operator ID registered in the deemed instruction process table 117 or in a case where the print condition does not coincide with the setting condition registered in the setting item, the display controller 106 may cause the operation display 12 to display an error reason and an error message (warning).

Modified Example 1

The preparatory action is not limited to the above description and, for example, elapse of predetermined time may be the preparatory action. The time acquisition unit 113 may acquire current time and notify the decision unit 107 of the acquired current time, and the execution controller 112 may control the execution unit to execute the job after predetermined time elapses since the image forming apparatus 1 has received the job.

Modified Example 2

In addition, in cases where the preparatory action, which is set in the deemed instruction process, is common to two or more jobs and the preparatory action is given, the execution controller 112 may execute the jobs according to the predetermined priorities based on the operation of the operator. For example, in cases where copying and scanning are registered as the deemed instruction process and the preparatory action is "authentication", the execution controller 112 executes a job on a side where the predetermined priority is higher between the copying and the scanning.

In this manner, even in a case where the preparatory action which is common to two or more jobs is registered, any one of the jobs is executed.

Modified Example 3

Figure 9:
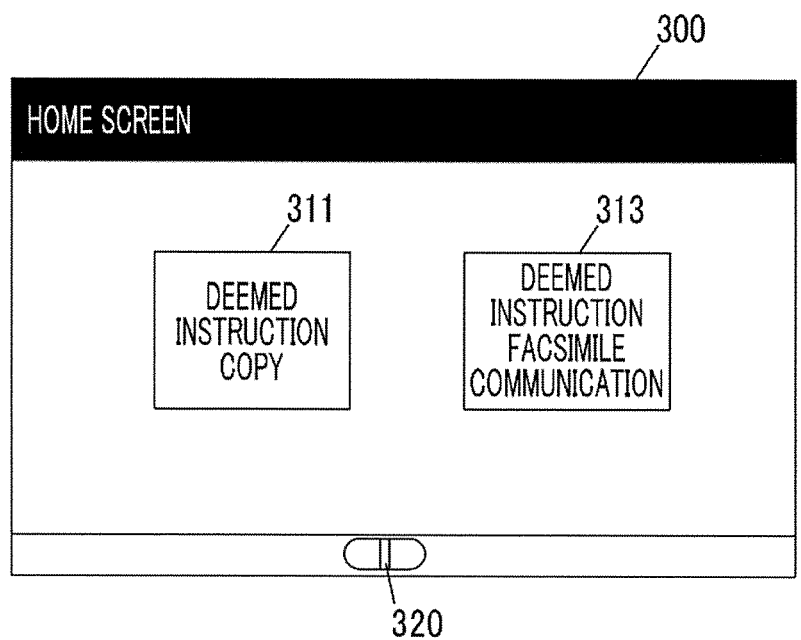
FIG. 9 is a diagram illustrating an example of a home screen 300 according to a modified example.

FIG. 9 is a diagram illustrating an example of the home screen 300 according to a modified example. As illustrated in FIG. 9, in the home screen 300, the deemed instruction copy button 311 and a deemed instruction facsimile communication button 313 are displayed on the same screen but the deemed instruction scan electronic mail button 312 and the deemed instruction print button 314 are not displayed together due to limitation of dimension of the screen. The home screen 300 includes a scroll box 320, and the deemed instruction scan electronic mail button 312 and the deemed instruction print button 314 are displayed by a scroll operation of the operator.

Here, even in a case where both the deemed instruction process (in the modified example, the deemed instruction copy or the deemed instruction facsimile communication), which is currently displayed on the same screen through the operation of the operator, and the deemed instruction process (in the modified example, the deemed instruction scan electronic mail or the deemed instruction print), which is not currently displayed on the same screen, are caused to be available through the operation of the operator, the execution controller 112 causes only the deemed instruction process, which is currently displayed, to be available, and causes the deemed instruction process, which is not currently displayed, to be unavailable.

In addition, the display controller 106 performs control such that the deemed instruction process button, which is currently displayed, is highlighted. In this manner, a job, which is not displayed on the home screen 300, being executed even though the operator recognizes that the job displayed on the home screen 300 functions, is avoided.

Second Exemplary Embodiment

Figure 10:
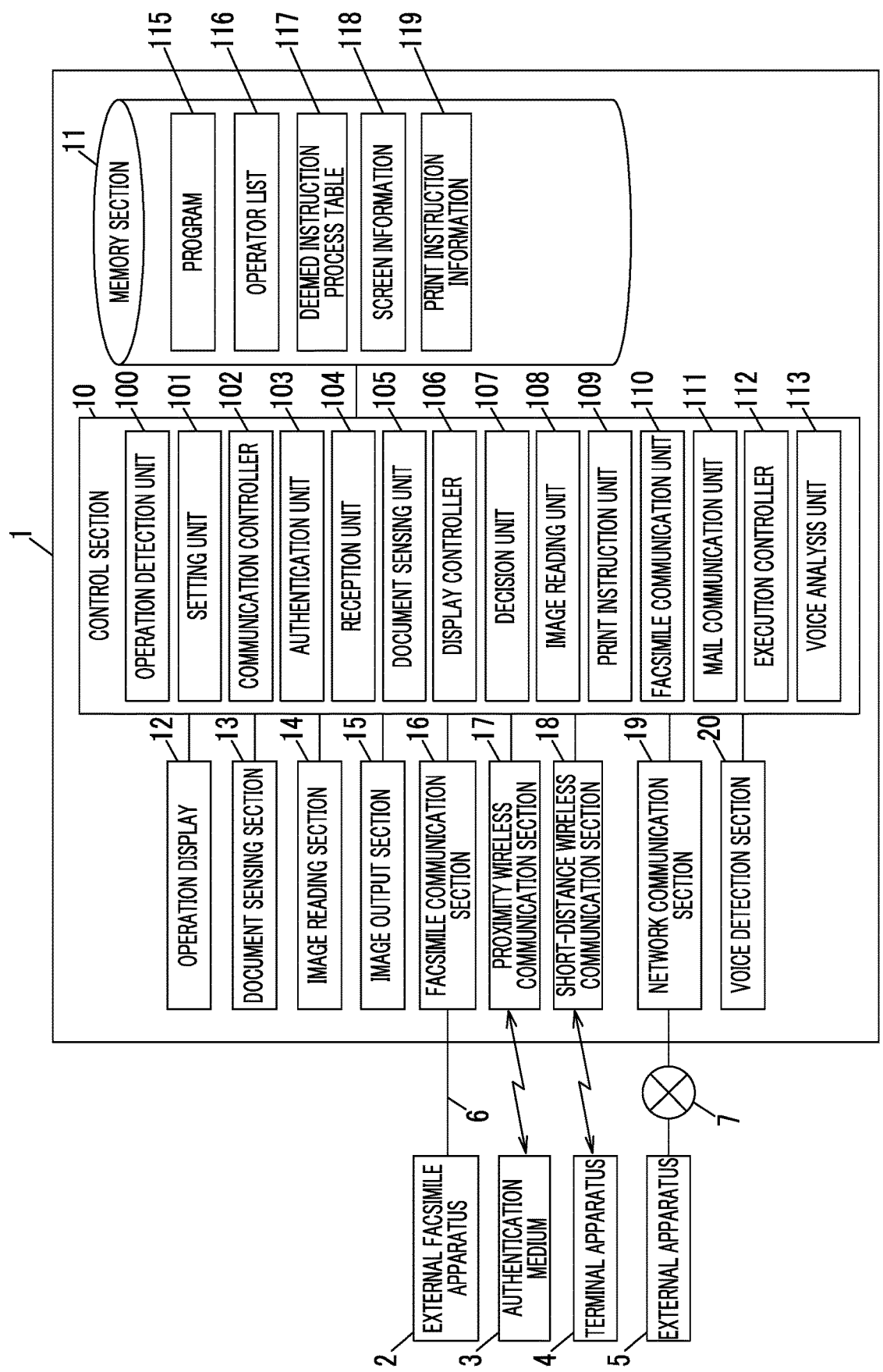
FIG. 10 is a block diagram illustrating an example of a control system of an image forming apparatus according to a second exemplary embodiment of the present invention.

FIG. 10 is a block diagram illustrating an example of a control system of an image forming apparatus according to a second exemplary embodiment of the present invention. The second exemplary embodiment is different from the first exemplary embodiment in that the recovery operation and the release operation described in the first exemplary embodiment are performed through voice recognition. Hereinafter, the second embodiment will be described based on facts that are different from the first exemplary embodiment.

The image forming apparatus 1 includes a voice detection unit 20. The voice detection unit 20 detects voice emitted from the operator, and transmits the voice as a voice signal to a voice analysis unit 114 which will be described later. The voice detection unit 20 is composed of, for example, a microphone that receives and detects the voice and the electrical signal, performs conversion on the voice, and outputs a result.

The control section 10 includes a voice analysis unit 114. The voice analysis unit 114 analyzes the voice signal output from the voice detection unit 20, and senses voice of the operator. The voice sensed by the voice analysis unit 114 is, for example, "release" or "recovery".

In a case where the voice analysis unit 114 detects the voice "release", control performed by an execution controller 112 on the job becomes unavailable. In contrast, the voice analysis unit 114 detects the voice "recovery", the control performed by the execution controller 112 on the job becomes available.

Operation of Second Exemplary Embodiment

In steps S1 to S3, the same operations as in the first exemplary embodiment are performed. That is, in a case where a preparatory action is detected (S1), the decision unit 107 decides whether or not the preparatory action is registered in the deemed instruction process table 117 (S2), and decides whether or not the job start condition is satisfied (S3). Subsequently, the decision unit 107 decides whether or not the release operation is performed by the voice analysis unit 114 (S4). In a case where the job start condition is satisfied (S3: Yes) and the release operation is not performed, that is, the control of the deemed instruction process is available (S4: Yes), the deemed instruction process is executed (S5).

Hereinabove, although exemplary embodiments of the present invention are described, the exemplary embodiments of the present invention are not limited to the above-described exemplary embodiments, and various modifications and executions are possible without changing the gist of the present invention.

For example, instead of the operation display 12 in the above-described exemplary embodiment, the external apparatus 5 may include the operation unit and the display. In this case, the operation of the operator may be performed by the operation unit of the external apparatus 5, and the display controller 106 may perform control such that the screen is displayed on the display of the external apparatus 5.

A part or all of the respective units of the control section 10 may be formed by a hardware circuit such as a Field Programmable Gate Array (FPGA) or specific Application Specific Integrated Circuit (ASIC).

In addition, it is possible to omit and change a part of the components of the above-described exemplary embodiment without changing the gist of the invention. In addition, it is possible to add, remove, change, and replace steps in the flow of the above-described exemplary embodiment without departing from the gist of the invention. In addition, it is possible to provide the program, which is used in the exemplary embodiment, by recording the program in a computer-readable recording medium such as a CD-ROM. In addition, it is possible to store the program in an external server, such as a cloud server, and to use the program through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor functioning as an execution unit that executes a first process or a second process with respect to a processing target in a case where an execution instruction is given to any one of the first process and the second process specified by a setting item and a preparatory action with respect to the processing target, wherein the preparatory action for the first process is a combination of a start of an application which executes a function and a disposition of the processing target on a document stand and the preparatory action for the second process is a combination of an authentication of an operator and the disposition of the processing target on the document stand, and wherein the first process is executing the function on images read from the processing target and the second process is printing;
a memory that stores the preparatory action for the first process and the preparatory action for the second process in association with the respective setting item; and
an execution controller that deems that the execution instruction is given in a case where the preparatory action stored in the memory is given, and controls the execution unit such that the first process or the second process specified by the preparatory action and the setting item stored in the memory in association with the preparatory action is executed with respect to the processing target.

2. The information processing apparatus according to claim 1,
wherein, in a case where the preparatory action is common to the first process and the second process, the execution controller controls the execution unit such that the first process or the second process is executed according to priorities.

3. The information processing apparatus according to claim 1, wherein the processor further functions as:
a first reception unit that receives an operation of switching between availableness and unavailableness of control performed by the execution controller for each of the first process, and corresponds to the first process; and
a second reception unit that receives an operation of switching between availableness and unavailableness of the control performed by the execution controller for each of the second process, and corresponds to the second process.

4. The information processing apparatus according to claim 2, wherein the processor further functions as:
a first reception unit that receives an operation of switching between availableness and unavailableness of control performed by the execution controller for each of the first process, and corresponds to the first process; and
a second reception unit that receives an operation of switching between availableness and unavailableness of the control performed by the execution controller for each of the second process, and corresponds to the second process.

5. The information processing apparatus according to claim 3, further comprising:
a display controller that highlights one of the first reception unit and the second reception unit, in which the control performed by the execution controller is caused to be available, rather than a remaining reception unit in which the control performed by the execution controller is caused to be unavailable.

6. The information processing apparatus according to claim 4, further comprising:
a display controller that highlights one of the first reception unit and the second reception unit, in which the control performed by the execution controller is caused to be available, rather than a remaining reception unit in which the control performed by the execution controller is caused to be unavailable.

7. The information processing apparatus according to claim 5,
wherein, in a case where the control performed by the execution controller is caused to be available with respect to both the first reception unit and the second reception unit, the display controller performs control such that the first reception unit or the second reception unit is highlighted according to the priorities.

8. The information processing apparatus according to claim 6,
wherein, in a case where the control performed by the execution controller is caused to be available with respect to both the first reception unit and the second reception unit, the display controller performs control such that the first reception unit or the second reception unit is highlighted according to the priorities.

9. The information processing apparatus according to claim 3, further comprising:
a display controller that performs control such that one of the first reception unit and the second reception unit, in which the control performed by the execution controller is caused to be available, is preferentially displayed rather than a remaining reception unit which the control performed by the execution controller is caused to be unavailable.

10. The information processing apparatus according to claim 4, further comprising:
a display controller that performs control such that one of the first reception unit and the second reception unit, in which the control performed by the execution controller is caused to be available, is preferentially displayed rather than a remaining reception unit in which the control performed by the execution controller is caused to be unavailable.

11. A non-transitory computer readable medium storing a program causing a computer, which includes a memory unit which stores a preparatory action for the first process and a preparatory action for the second process in association with a respective setting item, to function as:
an execution unit that executes a first process or a second process with respect to a processing target in a case where an execution instruction is given to any one of the first process and the second process specified by a setting item and the preparatory action with respect to the processing target, wherein the preparatory action for the first process is a combination of a start of an application which executes a function and a disposition of the processing target on a document stand and the preparatory action for the second process is a combination of an authentication of an operator and the disposition of the processing target on the document stand, and wherein the first process is executing the function on images read from the processing target and the second process is printing; and
an execution controller that deems that the execution instruction is given in a case where the preparatory action stored in the memory is given, and controls the execution unit such that the first process or the second process specified by the preparatory action and the setting item stored in the memory in association with the preparatory action is executed with respect to the processing target.

12. An information processing apparatus comprising:
a processor functioning as an execution means for executing a first process or a second process with respect to a processing target in a case where an execution instruction is given to any one of the first process and the second process specified by a setting item and a preparatory action with respect to the processing target, wherein the preparatory action for the first process is a combination of a start of an application which executes a function and a disposition of the processing target on a document stand and the preparatory action for the second process is a combination of an authentication of an operator and the disposition of the processing target on the document stand, and wherein the first process is executing the function on images read from the processing target and the second process is printing;
a memory means for storing the preparatory action for the first process and the preparatory action for the second process in association with the respective setting item; and
an execution control means for deeming the execution instruction is given in a case where the preparatory action stored in the memory is given, and controls the execution means such that the first process or the second process specified by the preparatory action and the setting item stored in the memory in association with the preparatory action is executed with respect to the processing target.

* * * * *